3,677,785
TRANSPARENT CRYSTALLIZED GLASS
Susumu Horikawa, Tokyo, and Kenshi Nakagawa, Tokorozawa-shi, Japan, assignors to Haya Glass Works Limited, Tokyo, Japan
No Drawing. Continuation of application Ser. No. 722,219, Apr. 18, 1968. This application Sept. 24, 1970, Ser. No. 75,288
Claims priority, application Japan, Apr. 25, 1967, 42/26,449
Int. Cl. C04b 33/00; C03c 3/04
U.S. Cl. 106—39 DV                              4 Claims

ABSTRACT OF THE DISCLOSURE

Transparent crystallized glass having a low liquidus temperature, a low thermal expansion and a high bending strength obtained by heating parent glass composed of $SiO_2$ 65 to 75 weight percent, $Li_2O$ 2.5 to 4.5 weight percent, $Al_2O_3$ 15 to 25 weight percent, BaO 1.3 to 4.0 weight percent, MgO 1.3 to 2.0 weight percent, BaO+MgO 2.6 to 5.0 weight percent, $ZrO_2$ 1 to 2 weight percent and $TiO_2$ 1 to 2 weight percent, said parent glass being very stable for devitrification in forming.

---

This case is a continuation of Ser. No. 722,219, filed Apr. 18, 1968, which is now abandoned.

This invention relates to crystallized glass which is obtained by heat treatment of $SiO_2$-$Li_2O$-$Al_2O_3$-BaO-MgO glass containing $ZrO_2$ and $TiO_2$, which act as nucleation catalysts for subsequent crystallization.

It is known that when $SiO_2$-$Li_2O$-$Al_2O_3$ glass containing over 2 weight percent of $ZrO_2$ is melted at lower temperature than the temperature which is high enough to melt the glass homogeneously, fine stones of $ZrO_2$ remain undissolved in said glass, and that by heat treatment of said glass these stones act as nuclei for subsequent crystallization, whereby a transparent crystallized glass is obtained. But said parent glass has such defects that its liquidus temperature is high because of a comparatively large quantity of $ZrO_2$, thereby being easy to devitrify.

It is also known that $SiO_2$-$Li_2O$-$Al_2O_3$ glass containing 3 to 7 weight percent of $TiO_2$ changes to a transparent crystallized glass by heat treatment, however said crystallized glass has such a defect that it bears a brown color, this color being remarkable in case of containing a trace of iron oxide which entered in raw materials of glass as an impurity.

The chief object of the invention is to obviate such defects and to provide transparent crystallized glass having a low liquidus temperature, a low thermal expansion and a high bending strength, the parent glass being very stable for devitrification in forming.
No. 75445 Rampmeyer, C. M. 6–19–72 Day Mach. 58

In case that $TiO_2$ is added over 2 weight percent of $SiO_2$-$Li_2O$-$Al_2O_3$ glass, said glass separates into two phases by heat treatment in the neighborhood of the transition temperature, and one of the separated phases consists of droplets of the size ranging to a few hundred A., from which many fine crystallites are deposited by heating up to the softening temperature. The crystallized glass bears a brown color as increasing of the quantity of $TiO_2$.

If the quantity of $TiO_2$ is less than 2 weight percent, the separated droplets become large in size and small in number by heating in the neighborhood of the transition temperature, and in this case the glass does not crystallize homogeneously by heating up to the neighborhood of the softening temperature, because $TiO_2$ does not act as a nucleation catalyst for subsequent crystallization. However, in this case, if $ZrO_2$ is added about 2 weight percent to the glass, $ZrO_2$ acts as a nucleating agent, whereby said glass crystallizes homogeneously by heating up to the neighborhood of the softening temperature. Crystal particles deposited in said glass are very fine, whereby the transparency increases, decreasing the scattering in the short wave length range of the visible light, and resulting in a considerably low degree of color. On the other hand, if the quantity of $ZrO_2$ is less than 1 weight percent, large crystals are deposited in the glass by the same heat treatment, and as a result a low transparency of the crystallized glass is obtained.

In case of $ZrO_2$ being added to $SiO_2$-$Li_2O$-$Al_2O_3$ glass, $ZrO_2$ becomes difficult to dissolve as the added quantity increases, and at the same time the liquidus temperature of said glass becomes higher, and therefore becomes easy to devitrify in forming. The inventors have discovered that the addition of a small amount of BaO and/or MgO decreases the liquidus temperature of the above-mentioned glass without an unfavorable side effect on the desirable properties of glass ceramics such as the transparency in the visible range. Especially, in the case of when both BaO and MgO are added, the liquidus temperature of said glass becomes very much lower than when adding BaO or MgO alone. Further, we have found that BaO and/or MgO promote the dissolution of $ZrO_2$ in said glass. Especially, in case of the quantity of $ZrO_2$ being less than 2 weight percent in said glass containing both BaO and MgO, $ZrO_2$ dissolves perfectly in said glass, whereby said glass melts homogeneously and is very stable for devitrification in forming such as automatic forming. Moreover, the crystallized glass has a high bending strength, and accordingly, the parent glass can be formed manually and mechanically.

Thus the crystallized glass according to the invention is obtained by heat treatment of parent glass, which is composed of $SiO_2$ 65 to 75 weight percent. $Li_2O$ 2.5 to 4.5 weight percent, $Al_2O_3$ 15 to 25 weight percent, BaO 1.3 to 4.0 weight percent, MgO 1.3 to 2.0 weight percent, BaO+MgO 2.6 to 5.0 weight percent, $ZrO_2$ 1 to 2 weight percent and $TiO_2$ 1 to 2 weight percent.

The reasons for the above defined limitations of the composition of the parent glass are as follows:

If the quantity of $SiO_2$ is under 65 weight percent, the transparency of the crystallized glass decreases and the parent glass becomes easy to devitrify, and if said quantity is over 75 weight percent, melting of said parent glass becomes difficult because of high viscosity; if the quantity of $Li_2O$ is under 2.5 weight percent, the viscosity of the glass becomes high and melting becomes difficult, and if said quantity is over 4.5 weight percent, the transparency of the crystallized glass decreases and the parent glass becomes easy to devitrify; if the quantity of $Al_2O_3$ is under 15 weight percent, the parent glass becomes easy to devitrify, and if said quantity is over 25 weight percent, said glass becomes difficult to melt; if each quantity of BaO and MgO is under 1.3 weight percent and the quantity of BaO+MgO is under 2.6 weight percent, the liquidus temperature of the parent glass rises and it becomes easy to devitrify, and if the quantity of BaO is over 4.0 weight percent, that of MgO is over 2.0 weight percent and that of BaO+MgO is over 5.0 weight percent, the transparency of the crystallized glass decreases; if the quantity of $ZrO_2$ is under 1 weight percent, the transparency of the crystallized glass decreases because deposited crystals are large, and if said quantity is over 2 weight percent, $ZrO_2$ becomes difficult to dissolve and the glass becomes easy to devitrify because its liquidus temperature becomes high; and if the quantity of $TiO_2$ is under 1 weight percent, the transparency of the crystallized glass decreases because of deposited crystals being large, and if said quantity is over 2 weight percent, the color of the crystallized glass becomes strong.

In order to promote melting of the glass a small quantity of $Na_2O$, $K_2O$ and $B_2O_3$ is preferably added, but over 0.5 weight percent of $Na_2O$, over 2 weight percent $K_2O$ and over 0.5 weight percent $B_2O_3$ are to be avoided because of a decrease of the transparency. Further $As_2O_3$ or $Sb_2O_3$ may be added as a refining agent.

Now, some examples embodying the invention and their properties are tabulated as follows, glass compositions being in weight percent:

| Number | 1 | 2 | 3 |
|---|---|---|---|
| $SiO_2$ | 68.1 | 71.1 | 66.0 |
| $Li_2O$ | 4.1 | 3.2 | 2.8 |
| $Al_2O_3$ | 18.6 | 17.9 | 24.0 |
| BaO | 1.4 | 3.0 | 1.5 |
| MgO | 1.4 | 1.4 | 1.4 |
| $ZrO_2$ | 1.8 | 1.5 | 1.9 |
| $TiO_2$ | 1.8 | 1.5 | 1.4 |
| $K_2O$ | 0.5 |  | 1.0 |
| $As_2O_3$ | 1.4 |  |  |
| $Sb_2O_3$ |  | 0.4 |  |
| $P_2O_5$ |  | 0.9 |  |
| Properties of patent glasses: |  |  |  |
| Transition temperature (° C.) | 710 | 750 | 760 |
| Deformation temperature (° C.) | 790 | 820 | 830 |
| Conditions of crystallization: |  |  |  |
| Crystallization temperature (° C.) | 850 | 850 | 850 |
| Crystallization time (hours) | 2 | 2 | 2 |
| Properties of crystallized glasses: |  |  |  |
| Coefficient of thermal expansion ($\times 10^{-7}$/° C.) | −5 | −6 | 13 |
| Deformation temperature (° C.) | 1,100 | 1,100 | 1,100 |
| Bending strength (kg./cm.$^2$) | 1,800 | 1,800 | 1,800 |

Raw materials containing the above glass compositions are melted at 1,550° to 1,600° C. for 7 to 10 hours, and produced parent glass is formed into any suitable articles by molding or other means. After cooling down to the room temperature, they are heated at the velocity of 2° C. per minute up to 850° C. and soaked at said temperature for 2 hours, and then cooled, obtaining such crystallized glass as above stated.

The average transmittance of the visible light through said crystallized glass of 1 cm. thickness is 80%, but if the crystallization temperature is over 950° C., the crystallized glass becomes white and opaque, having a considerably high bending strength.

Moreover, as to the above exampled crystallized glasses the liquidus temperatures are about 1,270° C. and the temperatures showing the coefficient of viscosity $10^{3.5}$ poises are about 1,350° C., and accordingly, devitrification does hardly occur because the liquidus temperatures are lower than the forming temperatures.

According to the invention the parent glass is very stable for devitrification when formed, and therefore, it can be mechanically formed, and the crystallized glass is transparent and has a low coefficient of thermal expansion and a high bending strength, and further, contains a small quantity of $Li_2O$ of high cost, and accordingly, said glass can be made of raw materials of low costs and is very suitable for making kitchen wares, industrial and scientific implements, etc.

What we claim is:

1. Transparent crystallized glass, which is obtained by heat tretament of parent glass composed of 65 to 75 weight percent of $SiO_2$, 2.5 to 4.5 weight percent of $Li_2O$, 15 to 25 weight percent of $Al_2O_3$, 1.3 to 4.0 weight percent of BaO, 1.3 to 2.0 weight percent of MgO, 2.6 to 5.0 weight percent of BaO+MgO, 1 to 2 weight percent of $ZrO_2$ and 1 to 2 weight percent of $TiO_2$, said glass having a lower liquidus temperature than the same glass containing only one component from the group consisting of BaO and MgO.

2. Transparent crystallized glass according to claim 1, further containing a small quantity of at least one member selected from the group consisting of $Na_2O$, $K_2O$ and $B_2O_3$ but not over (a) 0.5 weight percent of $Na_2O$, (b) 2 weight percent of $K_2O$ and (c) 0.5 weight percent of $B_2O_3$ because higher amounts result in a decrease in the transparency of the glass.

3. Transparent crystallized glass according to claim 1 further containing a small quantity of at least one member selected from the group consisting of $As_2O_3$ and $Sb_2O_3$ as a refining agent.

4. Transparent crystallized glass according to claim 2 further containing a small quantity of at least one member selected from the group consisting of $As_2O_3$ and $Sb_2O_3$ as a refining agent.

References Cited
UNITED STATES PATENTS

| 3,582,385 | 6/1971 | Duke et al. | 106—39 DV |
| 3,380,818 | 4/1968 | Smith | 106—39 DV |
| 3,499,773 | 3/1970 | Petticrew et al. | 106—39 DV |

TOBIAS E. LEVOW, Primary Examiner

M. L. BELL, Assistant Examiner

U.S. Cl. X.R.

106—52